Jan. 13, 1970  S. C. COCKRELL ET AL  3,489,036
HYDROMECHANICAL TRANSMISSION
Filed Dec. 29, 1967  5 Sheets-Sheet 1
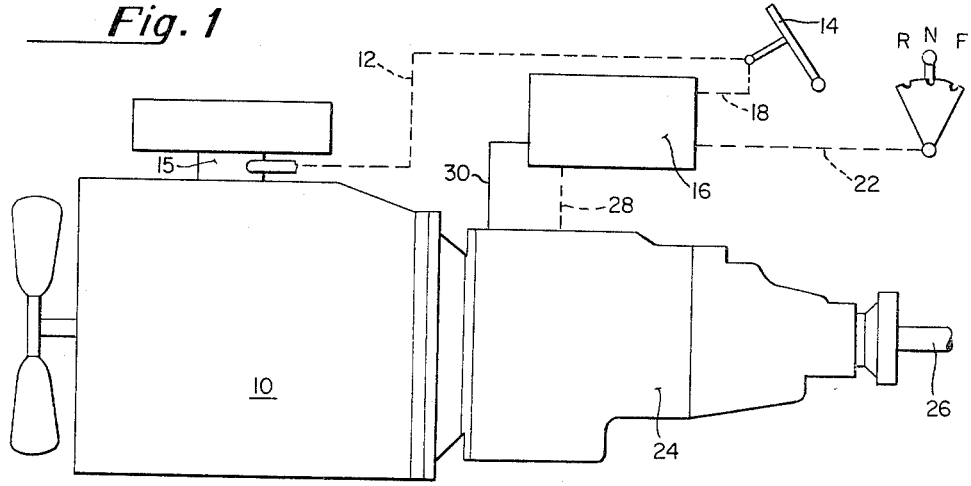
*Fig. 1*
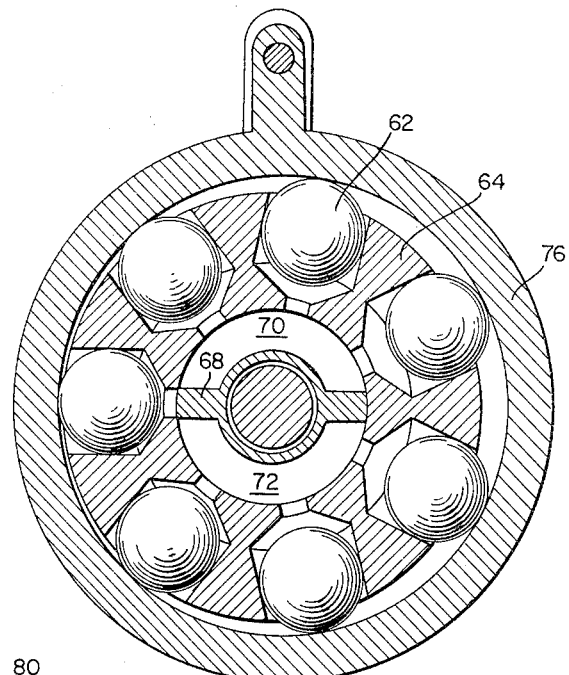
*Fig. 3*
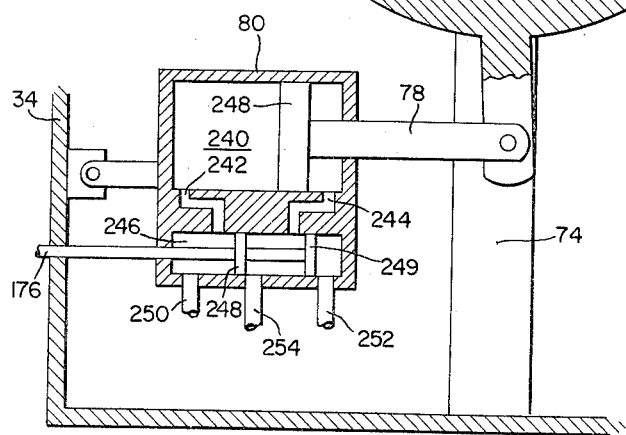
INVENTORS.
SANFORD C. COCKRELL
ROBERT J. DORGAN
BY
R H Quist
ATTORNEY.

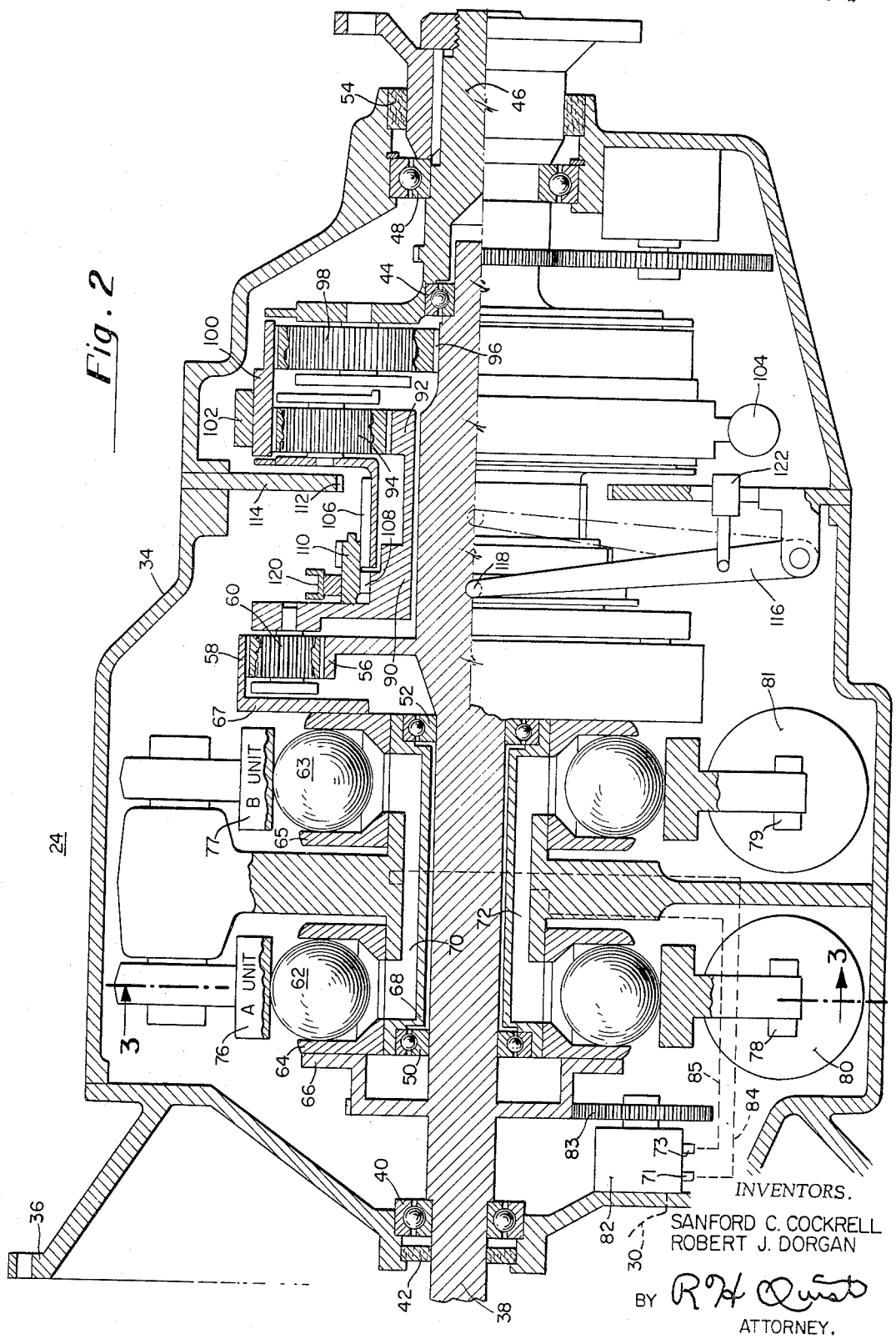

INVENTORS.
SANFORD C. COCKRELL
ROBERT J. DORGAN
BY
ATTORNEY.

3,489,036
Patented Jan. 13, 1970

3,489,036
HYDROMECHANICAL TRANSMISSION
Sanford Charlton Cockrell, Cincinnati, Ohio, and Robert John Dorgan, Elnora, N.Y., assignors to General Electric Company, a corporation of New York
Filed Dec. 29, 1967, Ser. No. 694,606
Int. Cl. F16h 47/04
U.S. Cl. 74—687          4 Claims

ABSTRACT OF THE DISCLOSURE

A split torque transmission in which planetary gearing is used to combine the speeds and torques of a hydrostatic transmission and the input shaft. A second set of planetary gearing is used to combine the speeds and torques of the input shaft and the ring gear to drive the output shaft. Between the ring gear of the second set of planetary gearing and the planet gears of the first set, additional gearing is provided to drive the ring gear, first in the opposite direction from the planet gears, and second, in the same direction as the planet gears.

BACKGROUND OF THE INVENTION

This invention relates to a hydromechanical transmission suitable for use in driving heavy vehicles over a wide range of speeds.

Previously hydromechanical transmissions have been employed to drive tracked vehicles, trucks, and the like (see for example U.S. Patent 3,292,449 entitled "Power System Control"). As the load to be driven by the transmission increases, it becomes impractical merely to increase the size of the components (since increased losses result) or to decrease the gear ratios to provide greater torque (since the range of speeds available is decreased).

SUMMARY OF THE INVENTION

It is an object of this invention to provide a hydromechanical transmission having improved starting torque and reduced hydraulic losses, while maintaining wide speed range capability.

In a preferred form of the invention, a portion of the power delivered to the transmission is passed through a hydrostatic transmission. This hydrostatic transmission has a pair of similar ball piston units (the A and B units) one of which pumps fluid which causes the other to rotate. For the most part the A unit, which is connected to the input shaft, pumps fluid to the B unit, which is connected to a ring gear. Under some operating conditions such as dynamic braking, however, the power flow would be reversed. The A and B units are provided with controls for individually varying their capacities. Thus the ring gear can be driven at speeds other than that of the input shaft, and even in the opposite direction.

The ring gear is one part of a first planetary gear system also including a sun gear connected to the input shaft, and a set of planet gears. A second planetary gear system having a sun gear connected to the input shaft, a ring gear, and a set of planet gears operatively connected to the transmission output shaft is also provided.

In addition to the foregoing, means are provided to operatively connect the support for the planet gears of the first planetary gear system and the ring gear of the second planetary gear system in two modes. In the first mode, the ring gear is driven in the opposite direction from the planet gear support; while in the second mode, the ring gear is driven in the same direction as the planet gear support. Transiton between the modes occurs during a period of acceleration (and the similar period of deceleration) when the planet gear support of the first gear system and the ring gear of the second gear system are stopped.

BRIEF DESCRIPTION OF THE DRAWINGS

FIGURE 1 is a schematic of a power system employing the transmission of this invention;
FIGURE 2 is a partial cross-section of the transmission of this invention;
FIGURE 3 is a cross-section along the line 3—3 of FIGURE 2.

DESCRIPTION OF THE PREFERRED EMBODIMENT

Figure 4:
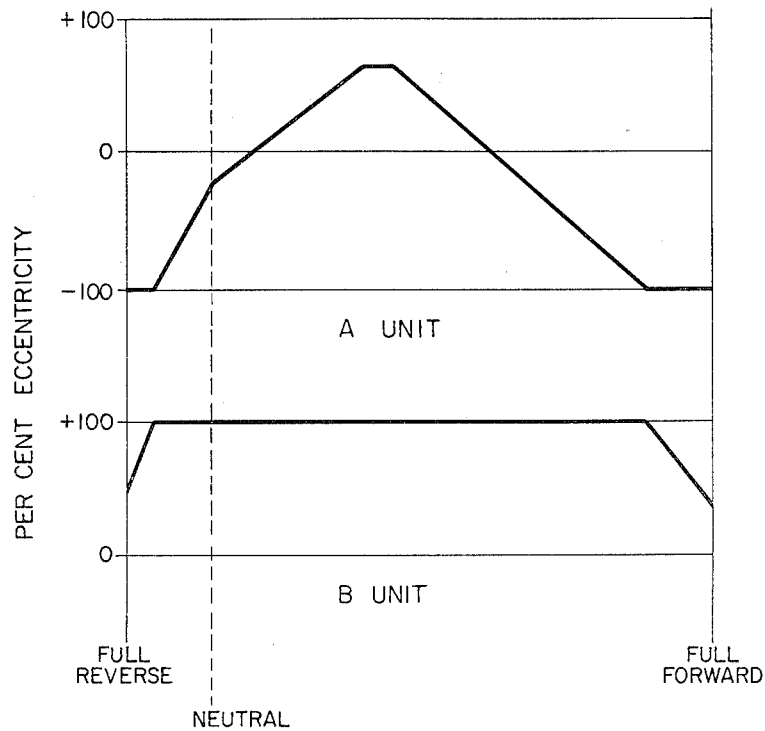
FIGURE 4 is a graph showing the percent eccentricities of the A and B units when the transmission operates from full reverse to full forward.

In order to illustrate a typical application of the transmission of this invention, reference will be made first to FIGURE 1. Prime mover 10 is controlled by mechanical linkage 12 connecting accelerator pedal 14 to the fuel flow regulator of carburetor 15. Accelerator pedal 14 is also connected to control unit 16 by mechanical linkage 18. Drive selector 20, connected to control unit 16 by mechanical linkage 22, affords the operator reverse, neutral, and forward modes of operation.

Transmission 24 converts the torque and speed produced by prime mover 10 to a desired torque and speed which is delivered to drive shaft 26. Transmission 24 is of an infinitely variable ratio type designed to minimize fuel consumption and provide stepless changes in speed and torque output over a wide range. These changes are actuated by control unit 16 through mechanical connections 28 in response to the demands of the operator, and hydraulic connection 30 (signaling the prime mover speed).

Referring next to FIGURE 2, the structure of transmission 24 will be described. Housing 34 is configured generally to conform with the elements contained therein. Flange 36 connected to housing 34 provides for securing transmission 24 to the prime mover. Power is delivered to transmission 24 by input shaft 38. Input shaft 38 is supported by bearing 40, and is surrounded by seal 42 to keep foreign matter out of housing 34 and to retain oil within the housing. Input shaft 38 is supported at the other end by bearing 44 within a cavity of output shaft 46. Output shaft 46 is in turn supported by bearing 48. Further support for input shaft 38 is provided by bearings 50 and 52. Seal 54 between housnig 34 and output shaft 46 serves the same function as seal 42.

Transmission 24 is of the split torque type wherein there are two paths for power passing through the transmission. Some type of epicycloid gearing is ordinarily used to combine the speeds and torques of the two power paths to produce a desired speed and torque output. In this embodiment, sun gear 56 is secured to input shaft 38 and so rotates at the prime mover speed. Ring gear 58 may be rotated at a different speed by the means to be described, and planet gears 60 then rotate about shaft 38 at a third, different speed.

A hydraulic unit is provided for controlling the rotation of ring gear 58, consisting of similar A and B units with interconnecting hydraulic paths. In the usual operation of the system the A unit is driven by the prime mover and pumps hydraulic fluid to the B unit. The B unit, under these circumstances, is driven by the hydraulic fluid and acts as a motor. In other circumstances, for example dynamic braking, the B unit may act as a pump and the A unit as a motor delivering power to input shaft 38.

As is more clearly illustrated in FIGURE 3, showing the A and B units each contain several ball pistons 62 and 63 respectively, which may freely reciprocate within cylinder blocks 64 and 65 respectively. Cylinder block 64 of the A unit is connected by flange 66 to input shaft 38. In a similar manner, flange 67 connects cylinder block 65 to ring gear 58.

Concentric with input shaft 38, but spaced from it, is stationary pintle 68. Pintle 68 contains hydraulic passages 70 and 72 connecting the A and B units. Pintle 68 is maintained in position by pintle support 74 which is secured to housing 34. Pintle support 74 also pivotally supports races 76 and 77 of the A and B units respectively. Diametrically opposite from this pivotal support of races 76 and 77 are secured race positioning members 78 and 79 respectively.

The positioning of race positioning members 78 and 79 and consequently races 76 and 77 is controlled by race positioning actuator units 80 and 81. Races 76 and 77 can thereby be positioned eccentrically with respect to cylinder blocks 64 and 65, either as illustrated, or in the opposite direction. In addition, concentric positions of races 76 and 77 may also be obtained.

Reserving further description of positioning actuator units 80 and 81 for a later time, the manner in which ring gear 58 is driven will now be described. Hydraulic fluid is scavenged from the bottom of housing 34 by positive displacement pump 82 driven by input shaft 38 through gear 83. Hydraulic lines 84 and 85 (illustrated as broken lines) convey this fluid to hydraulic passages 70 and 72 respectively in pintle 68. Check valves 71 and 73 are provided in hydraulic lines 84 and 85 respectively.

As cylinder block 64 of the A unit is driven in a clockwise direction (FIGURE 3), it will be noted that ball pistons 62 move gradually radially outward from the 9 o'clock to 3 o'clock positions (due to centrifugal force), and then are forced radially inward from the 3 o'clock to 9 o'clock positions (due to race 76). As the ball pistons move outward, hydraulic fluid from hydraulic passage 70 is admitted into the cylinders. On the other hand, as each ball piston passes the 3 o'clock position and is forced inward, the hydraulic fluid is forced from the cylinder into hydraulic passage 72 under high pressure.

The fluid in passage 72 is conveyed to the B unit. Assuming race 77 of the B unit is eccentrically positioned in the same direction as race 76, the high pressure fluid will tend to force ball pistons 63 adjacent to passage 72 outward, causing a reaction on cylinder block 65 tending to rotate it in a counterclockwise direction. As the ball pistons pass the 3 o'clock position, the fluid will be delivered into passage 70 and returned to the A unit. It should be understood that the pressure of the fluid in passage 72 is much greater than that in passage 70. If race 77 of the B unit were concentrically positioned with respect to cylinder block 65, no reaction and no rotation will result. In addition, if race 77 of the B unit is eccentrically positioned in the opposite direction, clockwise rotation of cylinder block 65 will be produced.

The rotational speed of the cylinder blocks of the A and B units need not be the same. For example, if race 76 of the A unit is given its maximum eccentricity, while race 77 of the B unit is only slightly eccentric, cylinder block 65 of the B unit must rotate faster to deliver the fluid to hydraulic passage 70 due to its smaller capacity. By appropriately adjusting the eccentricities of races 76 and 77 it is therefore possible to vary the speed and direction of rotation of ring gear 58.

Planet gears 60 are rotatably supported by planet gear support 90 having a longitudinal extension spaced from, but concentric with input shaft 38. Sun gear 92 formed on the extension of planet gear support 90 meshes with planet gears 94.

Sun gear 96 on input shaft 38 meshes with planet gears 98 which are rotatably supported by an extension of output shaft 46. Common ring gear 100 meshes with both planet gears 94 and planet gears 98 although the number of teeth on the two portions of common ring gear 100 may differ.

Brake band 102 on ring gear 100 stops ring gear 100 when actuator 104 is operated.

Splined cylinder 106 is joined to the support for planet gears 94. Similar splines 108 are formed on planet gear support 90 so that spline connector 110, in the position shown, joins planet gear support 90 and splined cylinder 106 for rotation together. Spline connector 110 also has splines on the outer side adapted to mesh with splines 112 which are fixed by support 114 to housing 34. By moving spline connector 110 to the right, therefore, splined cylinder 106 is prevented from rotating. Planet gears 94 in this condition are also prevented from moving about the axis of transmission 24.

Spline connector 110 is moved between its right and left positions by wishbone lever 116. Wishbone lever 116 has ends which terminate in pins 118 diametrically disposed in annular track 120 of spline connector 110. Hydraulic actuator 122 is pinned to wishbone lever 116 to effect the desired movements.

The advantages to be derived from the transmission of this invention can be best understood by reviewing the modes of operation.

Stop position

In order to have output shaft 46 stopped while input shaft 38 is rotating, the pitch line speeds of sun gear 96 and the portion of common ring gear 100 associated with planet gears 98 must be equal and opposite. In this condition planet gears 98 rotate in place. The necessary speed of common ring gear 100 (in a counterclockwise direction) is achieved in the following manner. Spline connector 110 is in the right position restricting planet gears 94 to rotation in place so they act as idler gears. Sun gear 92 must rotate in a clockwise direction (for counterclockwise rotation of ring gear 100, so that planet gears 60 must rotate about input shaft 38 in a clockwise direction. Since input shaft 38 is rotating in a clockwise direction, the desired direction of rotation of planet gears 60 will be achieved when ring gear 58 rotates in a clockwise direction. The proper direction of rotation of ring gear 58 results when the B unit is positioned eccentrically in the direction indicated in FIGURE 3 (this will be designated positive eccentricity), and the A unit is given negative eccentricity. The A unit, however, is positioned with only about 27 percent eccentricity while the B unit is given 100 percent eccentricity. FIGURE 4 illustrates the percent eccentricity of the A and B units under the various modes of operation.

Forward position

Assuming the operator has moved drive selector 20 to the forward position and is depressing accelerator pedal 14 to accelerate to top forward speed, the transmission will be automatically manipulated as described below. Generally, however, there is a first period of acceleration in which the counterclockwise rotation of common ring gear 100 is gradually reduced to zero. During this period output shaft 46 undergoes a transition from maximum torque at zero speed up to a point where about one quarter of prime mover speed is being delivered, (but at lesser torque). A second period of acceleration follows during which common ring gear 100 is given increasing clockwise rotation, adding to the clockwise rotation of sun gear 96, to produce a speed greater than prime mover speed or overdrive. Of course, torque continues to reduce.

The first period of acceleration is achieved by reducing the negative eccentricity of the A unit, through the point of zero eccentricity, and then increasing positive eccentricity up to about 66 percent. This change is a gradual one and initially reduces the speed of rotation of ring gear 58 down to zero. At this point planet gears 60 will be rotated entirely by sun gear 56. The further change of the eccentricity of the A unit in the positive direction causes a reversal of rotation of the B unit and ring gear 58 to counterclockwise rotation up to the point where the pitch line speed of ring gear 58 is equal and opposite to that of sun gear 56. At this point, while planet gears 60 are only rotating in place, brake band 102 is applied to prevent movement of common ring gear 100, and spline connector 110 is moved to the left. All power to output shaft 46 is being derived from sun gear 96 at this time.

With spline connector 110 in the left position, planet gear support 90 (which includes sun gear 92) is locked to splined cylinder 106 (which is secured to the axes of planet gears 94). As a result, planet gears 94 are prevented from rotating on their axes, and common ring gear 100 will be rotated directly by planet gears 60. In effect therefore, the transmission becomes one with two sets of planetary gearing in series.

At this time the second period of acceleration mentioned above begins, which starts by gradually reducing the positive eccentricity of the A unit. During this interval, as a result of the change in position of spline connector 110, common ring gear 100 is being rotated in the clockwise direction, thereby adding to the clockwise rotation of sun gear 96. When the positive eccentricity of the A unit reaches zero, and is then increased in the negative direction up to 100 percent, the B unit is caused to rotate in the clockwise direction. This causes ring gear 58 to rotate in a clockwise direction, adding to the clockwise rotation of sun gear 56 to produce faster clockwise rotation of planet gear support 90, and so on through the train.

A final interval of acceleration is achieved by reducing the positive eccentricity of the B unit until it is about 40 percent positive. This merely reduces the capacity of the cylinders of the B unit causing this unit to rotate faster.

Reverse position

When the operator moves drive selector 20 to the reverse position and begins to accelerate, the transmission automatically performs as follows. The negative eccentricity of the A unit is gradually increased from the 27 percent point, (which, it will be recalled, produced a pitch line speed in common ring gear 100 equal and opposite to that of sun gear 96), to 100 percent negative eccentricity. This increases the amount of fluid the A unit pumps to the B unit causing the B unit to rotate faster in the clockwise direction. This faster speed is carried through the gear train to produce a counterclockwise rotation of common ring gear 100 in which the pitch line speed exceeds that of sun gear 96 resulting in a counterclockwise rotation (reversal of output shaft 46). Further acceleration in the reverse direction is then achieved by reducing the positive eccentricity of the B unit to about 50 percent of its maximum.

Figure 5:
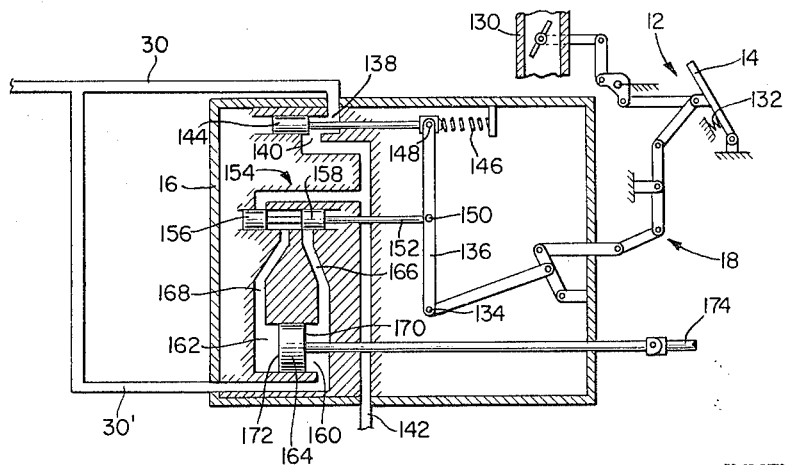
FIGURE 5 is a schematic of a control unit employed to operate the transmission.

Referring now to FIGURE 5, the structure and operation of control unit 16 will be described. The operator indicates a desired speed of drive shaft 26 (FIGURE 1) by adjusting the position of accelerator pedal 14. Accelerator pedal 14 is connected by mechanical linkage 12 to fuel flow regulator 130 to directly control the fuel supply as a function of pedal position. Depressing pedal 14 will increase the opening of fuel flow regulator 130 and thus tend to increase speed. Compression spring 132 will raise pedal 14, and decrease the opening of fuel flow regulator 130 when the operator raises his foot.

The position of pedal 14 is also transmitted through mechanical linkage 18 to position pin 134 at the lower end of link 136. Depressing pedal 14 moves pin 134 to the right, while releasing pedal 14 moves pin 134 to the left.

Positive displacement pump 82 (FIGURE 2) within transmission housing 34 is driven at a speed directly proportional to the prime mover speed, producing a flow in hydraulic connection 30 proportional to prime mover speed. This flow is supplied to piston cavity 138, exiting through metering orifice 140 to drain 142, and back into housing 34. Piston 144 within cavity 138 is loaded by spring 146 having a substantially constant force so as to close orifice 140 unless the fluid pressure within cavity 138 is sufficient to overcome the spring force. If the engine speed increases, the flow produced by pump 82 will increase, the pressure in cavity 138 will rise, and piston 144 will move to the left. This, however, will open orifice 140 to reduce the pressure. As a result, piston 144 and pin 148 at the upper end of link 136 quickly reach equilibrium positions for any prime mover speed. An increase in prime mover speed results in pin 148 moving to the left, while a decrease has the opposite effect.

On link 136, intermediate pin 150 is positioned in accordance with the positions of pins 134 and 148. Pin 150 is connected to stem 152 of pilot valve 154 having two small spaced pistons 156 and 158. The position of pin 150 and, therefore, the positions of pilot valve pistons 156 and 158 are proportional to the speed error, which is the difference between the required speed and the actual speed as indicated by the positions of pins 134 and 148.

Pilot valve 154 controls the flow of hydraulic fluid to piston cavities 160 and 162 on opposite sides of half-area drive ratio control piston 164, the hydraulic fluid being supplied to cavity 160 by branch 30' of hydraulic line 30. Piston cavities 160 and 162 are ported to pilot valve 154 through hydraulic lines 166 and 168, respectively. Pilot valve 154 is also ported to drain 142. Pilot valve pistons 156 and 158 and the ports communicating with lines 30', 166, 168, and 142 are positioned and proportioned such that the pressure in cavity 162 is one-half of that in cavity 160 when pin 150 is in a zero speed error position or, stated differently, when the required speed and the actual speed are the same. With the area of face 170 of control piston 164 being one-half that of face 172, it will be obvious that control piston 164 is in a null position in which the pressure forces acting on it are balanced. Piston 164 is connected to link 174 which leads to the transmission to set the drive ratio in accordance with its position. The link 174 is connected to control rod 176 extending into the housing 34 of the transmission as shown by FIGURE 3 through a drive selector (not shown) which converts the motion of link 174 into proper motion of rod 176 in accordance with the operator's instruction with respect to direction of drive.

For an example, suppose that the operator wishes to increase the vehicle speed. He depresses accelerator pedal 14 which directly opens the fuel flow regulator and moves pins 134 to the right. Since the actual engine speed does not change immediately, pin 150 also moves to the right carrying pistons 156 and 158 with it. The port opening to line 166 is further opened and the port to drain 142 is further closed, the result being a pressure increase in cavity 162 moving piston 164 to the right to change the drive ratio in the transmission. At the same time, the relatively slow increase in actual engine speed is increasing the pressure in cavity 138 and causing pin 148 to move to the left, pin 150 thus tending to return to the left to its zero speed error position. This, of course, begins to reduce the pressure in cavity 162. When pin 150 finally reaches its zero error speed position, the pressure forces acting on opposite faces 170 and 172 of piston 164 are again balanced, but piston 164 is in a new axial position and the transmission is operating at a new drive ratio at which the required and actual engine speeds are both equal to the engine speed at which the fuel consumption is lowest for the throttle setting.

At this point, the operator can compare the new vehicle speed with that desired. In the event that the actual and desired vehicle or system output speeds are not the same, the operator can make suitable adjustments in the position of accelerator pedal 14.

Figure 6:
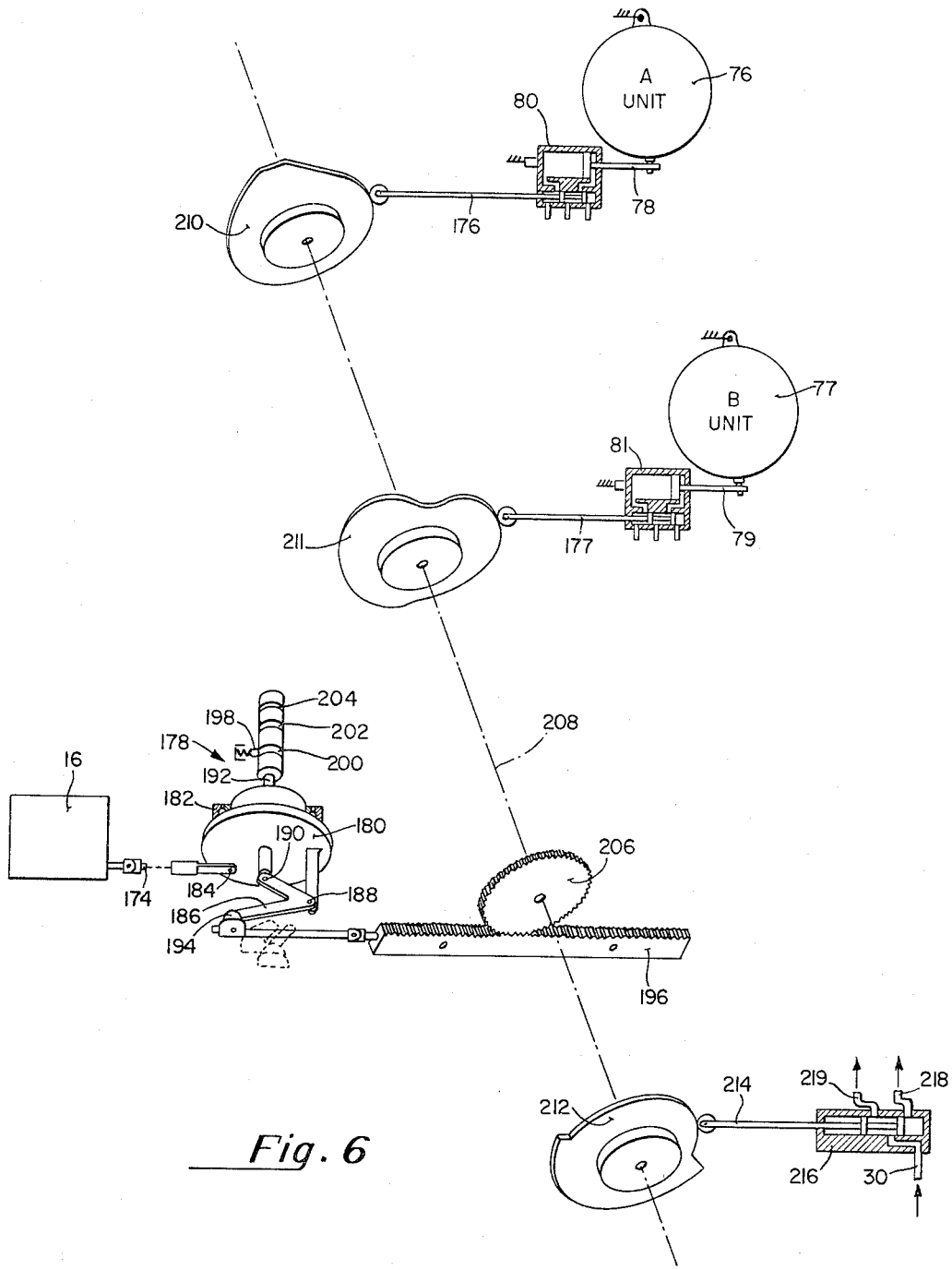
FIGURE 6 is a schematic showing the linkage between the control unit of FIGURE 5 and the A and B units.

It is noted above that link 174 from control unit 16 is connected to control rod 176 extending into housing 34 of the transmission through a drive selector for converting the motion of link 174 into proper motion of rod 176. A similar control ro dis provided for the B unit. Although its detailed features are not considered to be a part of the present invention, a suitable arrangement for converting movements of link 174 to the control rods of the A and B units is shown by FIGURE 6.

Drive selector 178 includes body member 180 rotatably mounted in bearing 182, link 174 being pinned to body 180 at 184 such that the rotational position of body member 180 is controlled by the position of link 174. Bell crank 186 is pivotally mounted on body 180 at 188, one end of the bell crank being connected at 190 to longitudinally movable shaft 192 and the other end of the bell crank being connected at 194 to rack 196. Shaft 192 is moved by the operator to one of three positions (by movement of drive selector 20 of FIGURE 1) in which spring loaded ball 198 engages a detent to lock shaft 192 in axial position. With ball 198 engaging detent 200, the bell crank assumes the position shown by solid lines in FIGURE 6 and motion of the link 174 is directly transmitted to rack 196 through member 180 and bell crank 186 such that movement of link 174 to the left causes movement of rack 196 to the left, and vice versa. If, however, ball 198 is engaging detent 202, the bell crank assumes an intermediate position in which point 194 is on the axis of rotation of body member 180. As a result, motion of link 174 and rotation of body member 180 has no effect on the position of rack 196. This is the neutral setting for the transmission. When ball 182 engages detent 204, bell crank 186 assumes an overcenter position in which movement of link 174 is converted into oppositely directed motion of rack 196. This is the position calling for reverse rotation of output shaft 46 of the transmission. A universal point or similar connection is provided between bell crank 186 and rack 196 permitting the motion of rack 196 as just described.

The longitudinal motion of rack 196 is translated into rotational motion by pinion 206. Shaft 208 imparts this rotational motion to cam 210 which produces longitudinal movements of control rod 176 associated with the A unit. In a similar manner, the rotation of cam 211 causes longitudinal movement of control rod 177 associated with the B unit. The required cam face configurations are developed from the ordinates of FIGURE 4.

Figure 7:
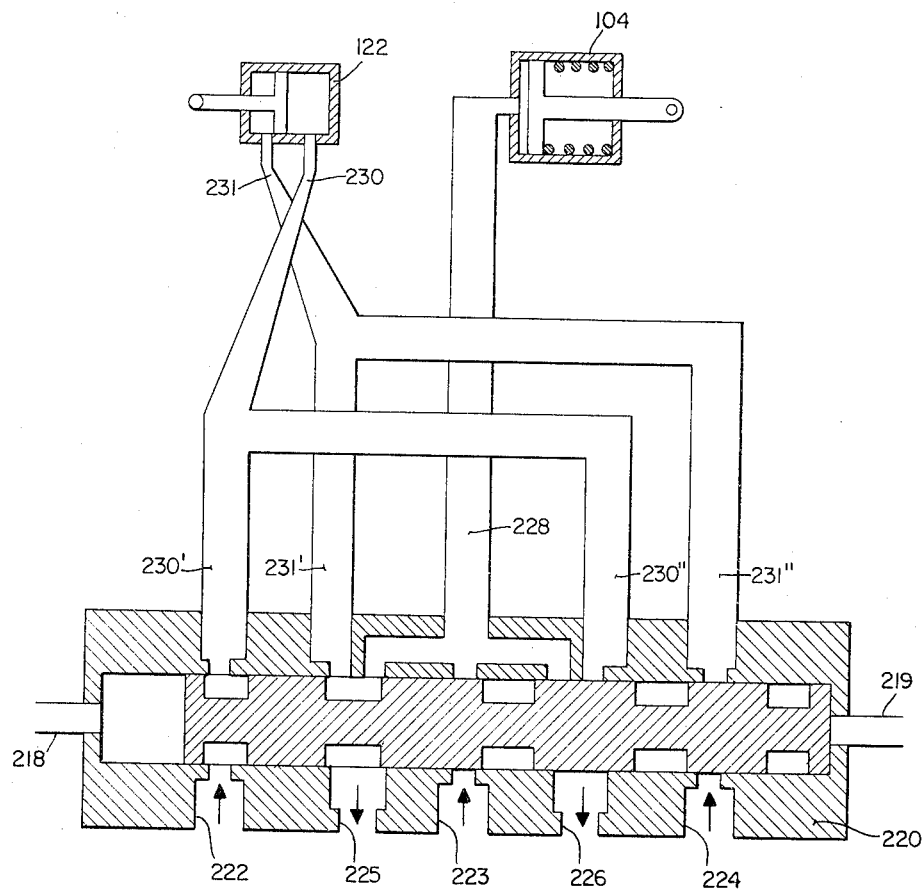
FIGURE 7 is a schematic primarily illustrating a sequencer valve employed.

Also driven by shaft 208 is cam 212. Cam follower 214 positions the pistons in pilot valve 216 so that hydraulic fluid from line 30 (supplied by pump 82 of FIGURE 2) will be delivered to either line 218 or 219. Lines 218 and 219 are connected to opposite ends of shuttle valve 220 illustrated in FIGURE 7. Shuttle valve 220 is designed so that when pressure is changed from one of lines 218 and 219 to the other, the various pistons contained therein will, in moving to the opposite end of the valve cylinder, cause a sequential opening and closing of the several passages as will be described.

Lines 222, 223, and 224 are all connected to a source of hydraulic fluid such as line 30 of FIGURE 2. Lines 225 and 226 are drains which drain hydraulic fluid back into transmission housing 34. Actuator 104 (for brakeband 102 of FIGURE 2) is connected by line 228 to shuttle valve 220. In the position illustrated, line 228 is connected to drain line 225. Hydraulic actuator 122 (connected to wishbone lever 116 of FIGURE 2) has lines 230 and 231 connected to its cylinder on opposite sides of its piston. Line 230 divides into lines 230' and 230'', while line 231 divides into lines 231' and 231''. In the position illustrated line 230' is connected to line 222, while line 231' is connected to drain line 225. Thus the piston of actuator 122 is held in the left position, as is spline connector 110 of FIGURE 2. When cam 212 of FIGURE 6 assumes the position shown, the pressure in line 219 will cause the pistons of shuttle valve 220 to move to the left.

The first result of this movement is that line 228 is disconnected from drain 225 and connected to line 223, so that brake band 102 stops ring gear 100 (FIGURE 2). As the pistons of shuttle valve 220 continue to the left, line 230' is disconnected from line 222, line 231' is next disconnected from line 225 while line 230'' becomes connected to drain line 226, line 231'' is then connected to line 224 (completing the transfer of pressure to the other side of the piston of actuator 122 and resulting in the movement of spline connector 110 to its right position), and finally line 228 is disconnected from line 223 and connected to line 226, releasing the brake.

When cam 212 of FIGURE 6 rotates so that pressure is supplied to line 218 to shift the pistons of shuttle valve 220 to the right, the same sequence of actions occurs; i.e., brake band 102 is first tightened, the pressure in actuator 122 is transferred to the opposite side of its piston causing spline connector 110 to move to its other position, and the brake is then released.

Having described how control unit 16 causes a change in the positioning of link 174 in response to the position of pedal 14 and the consequent prime mover speed, and further having described the linkage provided to convert this change in position of link 174 into appropriate changes in positions of control rods 176 and 177 of actuator units 80 and 81 respectively, the manner in which control rod 176 produces a change in position of race 76 of the A unit will be described referring to FIGURE 3.

Actuator 80 is pivotally supported by transmission housing 34. Cylinder 240 is provided with passages 242 and 244 connecting the ends of cylinder 240 with cylinder 246. Piston 248 is adapted for reciprocal movement in cylinder 240 in response to the pressures therein, causing movement of race positioning member 78. Control rod 176 extends into cylinder 246 to move spaced pistons 248 and 249. Drain lines 250 and 252 are provided to return hydraulic fluid to the transmission housing, while line 254 is connected to a source of hydraulic fluid such as line 30 connected to pump 82 (FIGURE 2). When control rod 176 is positioned as shown, fluid from line 254 will pass through passage 244 to one side of piston 248, while fluid on the other side of piston 248 will drain through passage 242 and line 250 causing piston 248 and race 76 to move to the left. Other positions of control rod 176 will result in other positions of race 76, giving the A unit a variable displacement capability. A similar arrangement is provided for the B unit.

The only other element of the apparatus is tow pump 256 (FIGURE 2) driven by output shaft 46. This pump would be connected in parallel with pump 82 so as to supply pressurized fluid to lines 30, 84, and 85 in the event the prime mover was to be started by pushing or towing the vehicle containing this transmission.

In the foregoing description spline connector 110 is moved from one position to the other to cause the transmission to change from one mode of operation to the other. The function of spline connector 110 is to operatively connect the support for planet gears 94 to the transmission housing in the first case and to the support for planet gears 60 (as well as sun gear 92) in the second case. It will be recognized that this function could also be performed by other means such as clutches.

The advantages of this invention can be employed in various ways. A smaller transmission can be fabricated to replace a larger transmission not employing this invention without loss of range or torque capabilities. On the other hand, by applying the advantage of this invention to an existing transmission improved starting torques with decreased losses result.

While a particular embodiment of a hydromechanical transmission has been shown and described, it will be obvious that changes and modifications can be made without departing from the spirit of the invention and the scope of the appended claims.

What is claimed is:
1. A split torque transmission comprising:
 (a) an input shaft;
 (b) an output shaft;
 (c) a hydrostatic transmission comprising a reversible hydraulic pump unit of variable displacement operatively associated with a reversible hydraulic motor unit of variable displacement and a closed hydraulic circuit interconnecting said pump and motor units for the reversible transmission of power therebetween, said pump and motor units being provided with controls for individually varying their capacities;
 (d) means to drive said hydraulic pump unit from said input shaft;
 (e) a first set of epicycloid gearing having a sun gear operatively connected to said input shaft, ring gear means, and a set of planet gears operatively connected to an output member;
 (f) means to couple said ring gear means of said first set of epicycloid gearing to said motor unit for variation in speed and direction of rotation of the ring gear;
 (g) a second set of epicycloid gearing having a first sun gear operatively connected to said input shaft, ring gear means, and a set of planet gears operatively connected to said output shaft;
 (h) means intermediate said first and second epicycloid gearing for driving the ring gear of said second epicycloid gearing by said output member in either a first mode wherein the direction of rotation of said ring gear is opposite to that of said output member, or a second mode wherein the direction of rotation of said ring gear is the same as said output member; and
 (i) means to effect transition between said modes when said output member and said ring gear of said second set of epicycloid gearing have stopped due to acceleration changes produced by capacity variation in said hydrostatic transmission.

2. A split torque transmission comprising:
 (a) an input shaft;
 (b) an output shaft;
 (c) a hydrostatic transmission comprising a reversible hydraulic pump unit of variable displacement operatively associated with a reversible hydraulic motor unit of variable displacement and a closed hydraulic circuit interconnecting said pump and motor units for the reversible transmission of power therebetween, said pump and motor units being provided with controls for individually varying their capacities;
 (d) means to drive said hydraulic pump unit from said input shaft;
 (e) a first set of epicycloid gearing having a sun gear operatively connected to said input shaft, ring gear means, and a set of planet gears operatively connected to an output member;
 (f) means to couple said ring gear means of said first set of epicycloid gearing to said motor unit for variation in speed and direction of rotation of the ring gear;
 (g) a second set of epicycloid gearing having a first sun gear operatively connected to said input shaft, a first set of planet gears associated with said first sun gear and operatively connected to said output shaft, a second sun gear connected to said output member, a second set of planet gears associated with said second sun gear, and a common ring gear associated with said first and second sets of planet gears in the second set of epicycloid gearing;
 (h) means intermediate said first and second epicycloid gearing for driving the ring gear of said second epicycloid gearing by said output member in either a first mode wherein the direction of rotation of said ring gear is opposite to that of said output member, or a second mode wherein the direction of rotation of said ring gear is the same as said output member; and
 (i) means associated with the second set of planet gears in said second set of epicycloid gearing for producing said first mode by restricting movement of said planet gears to rotation on their axes and for producing said second mode by causing said planet gears to rotate with said output member wherein the transition between said modes occurs when said output member and said ring gear of said second set of epicycloid gearing have stopped due to acceleration changes produced by capacity variation in said hydrostatic transmission.

3. A split torque transmission in accordance with claim 1 wherein said means intermediate said first and second epicycloid gearings comprises:
 an additional ring gear adapted to rotate with said ring gear of said second epicycloid gearing;
 a second sun gear adapted to rotate with said output member;
 a set of planet gears operatively associated with said additional ring gear and said second sun gear; and
 means associated with said planet gears for producing said first mode by restricting the movement of said planet gears to rotation on their axes, and for producing said second mode by causing said planet gears to rotate with said output member.

4. A split torque transmission in accordance with claim 3 wherein said means associated with said planet gears comprises:
 a splined cylinder portion on said output member;
 a splined cylinder portion on the support for said set of planet gears;
 an annular splined member supported by the housing of said transmission;
 a splined connector adapted to be moved between a first position wherein said annular splined member and said splined cylinder portion on the support for said set of planet gears will be operatively connected to produce said first mode, and a second position wherein said splined cylinder portion on said output member and said splined cylinder portion on the support for said set planet gears will be operatively connected to produce said second mode; and
 means for moving said splined connector between said first and second positions.

References Cited

UNITED STATES PATENTS

| | | | |
|---|---|---|---|
| 1,056,292 | 3/1913 | Nettenstrom | 74—691 |
| 2,102,634 | 12/1937 | Lysholm et al. | 74—792 X |
| 2,164,504 | 7/1939 | Dodge | 74—690 |
| 2,353,136 | 7/1944 | Bade | 74—690 |
| 2,817,250 | 12/1957 | Forster | 74—687 |
| 3,199,376 | 8/1965 | DeLalio | 74—687 X |
| 3,368,425 | 2/1968 | Lewis | 74—687 |
| 3,405,573 | 10/1968 | Takekawa | 74—687 |

FOREIGN PATENTS

| | | |
|---|---|---|
| 1,148,662 | 6/1957 | France. |

DONLEY J. STOCKING, Primary Examiner
THOMAS C. PERRY, Assistant Examiner

U.S. Cl. X.R.

74—681, 865